O. A. HAAS.
METAL CULVERT.
APPLICATION FILED DEC. 31, 1907.
935,971.  Patented Oct. 5, 1909.
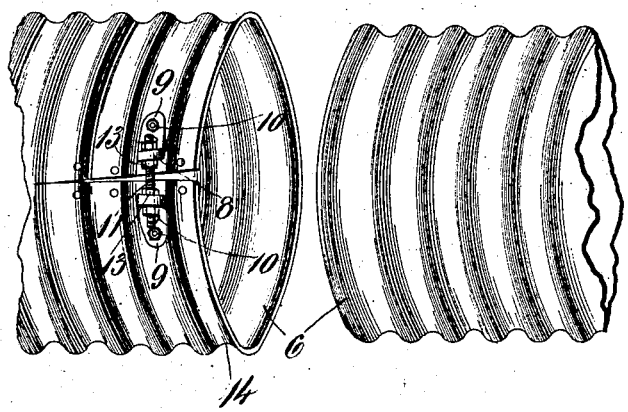
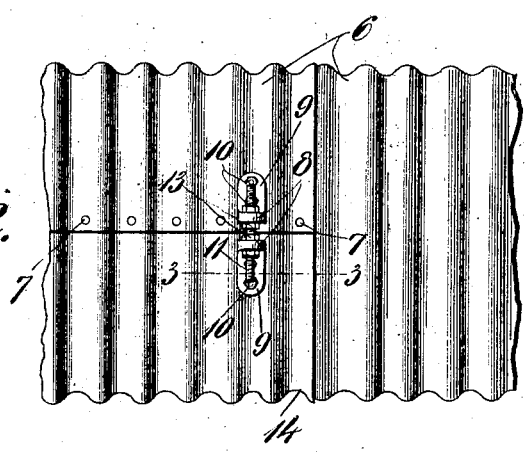
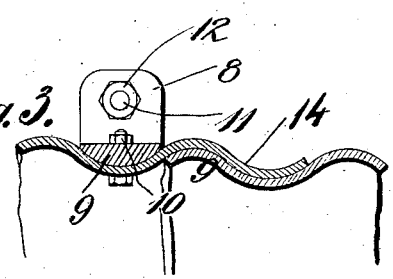

UNITED STATES PATENT OFFICE.

OTTO A. HAAS, OF EMPORIA, KANSAS.

METAL CULVERT.

935,971.      Specification of Letters Patent.      Patented Oct. 5, 1909.

Application filed December 31, 1907. Serial No. 408,782.

*To all whom it may concern:*

Be it known that I, OTTO A. HAAS, a citizen of the United States, residing at Emporia, in the county of Lyon and State of Kansas, have invented certain new and useful Improvements in Metal Culverts, of which the following is a specification.

This invention relates to corrugated metal culverts, pipes or tanks, which are ordinarily made from heavily galvanized sheet metal corrugated and formed into a cylinder.

The lengths in which the culverts can be made are limited by transportation and other conditions, specially in the larger sizes, hence it is necessary to splice two or more cylinders at the ends in order to make a culvert of the desired length. Heretofore the coupling or splice has been made by crimping down the end corrugation of one section until it will slip into the other, and then bolting the two together, but this is a matter of considerable trouble, and it is also unsatisfactory because it has been found that when pressure is applied to the culvert at the joint, the sections will shear the bolts and spread apart, which makes a leaky culvert which cannot well be cured without taking out the whole culvert. The sheets of which the culverts are made are commonly corrugated from one end to the other, and for this reason it is desirable that a coupling or joint be provided which can be used in connection with sheets so rolled, because if the sheets have to be flattened at the ends or edges, or otherwise specially rolled, it increases the cost. It is also desirable that a coupling be provided which can be readily and easily attached, since the sections usually have to be joined after they leave the factory and possibly at places where special facilities do not exist for sheet metal work requiring any special tools or appliances.

In view of these defects and considerations, the present invention has for its object to provide an improved form of or means for connecting together corrugated culvert sections which will be free from the objections indicated and which will answer the requirements referred to, as well as to provide a joint or connection which will be substantially as strong as any other part of the culvert.

The invention is illustrated in the accompanying drawings, in which—

Figure 1 is a perspective view illustrating two culvert sections, the end of one being open to admit the end of the other, preparatory to uniting the same. Fig. 2 is a perspective view showing the sections connected. Fig. 3 is a detail in section on the line 3—3 of Fig. 2.

In the present invention a lapped joint is formed by slipping the end of one section into the end of the other. The corrugated sections are indicated at 6, in the drawing, the sheets forming the sections being rolled and corrugated and then bent to circular form and lapped along a longitudinal seam which is closed by means of bolts 7 a row of which extends through the lapped edges. The device for connecting the sections consists of a pair of lugs 8, of cast metal or the like, the base parts 9 of which are shaped or curved on the bottom to fit within one of the corrugated depressions or grooves on the outer side of one of the sections. These lugs are fastened to the sheet metal by means of bolts 10, and they are located on opposite sides of the longitudinal seam. The lugs have openings to receive a bolt 11, which is threaded its entire length and which connects the lugs across the seam. The bolt is provided with two nuts 12 on the outside of the lugs and two nuts 13 on the inside thereof, so that the bolt may be utilized to spread the seam open as well as to close it. This pair of lugs is preferably located in the second corrugation or groove from the end of the section, so that the first or end corrugation, indicated at 14, will be free to lap the first corrugation on the inner section without any obstruction from the nuts or heads on the inner ends of the bolts 10. In connecting the culvert sections by means of this device the longitudinal seam of one section is open, or left unbolted, when it leaves the factory, at least for a short distance at the end, and its end may then be spread open by backing off the nuts 12 and screwing up the nuts 13, thereby enlarging the end of the section as shown in Fig. 1, in which condition the closed end of the adjacent section may be slipped within until the first corrugations are overlapped. Then by retracting the nuts 13 and screwing up the nuts 12, the outer section is clamped over the inner section and the longitudinal seam is closed, after which the bolts 7 can be put in place. By means of this simple device a very tight, bind and joint are produced, and since one corrugation overlaps into a depression of the other, the sections cannot be pulled apart lengthwise, but the joint will in all respects be practically as strong, if not stronger, than any other part of the culvert. It will be seen that this result is effected without any special angle plates or any great number of bolts, and without any projections on the inside of the culvert, and with only a slight projection on the outside. Special flat rolling at either the circular or the longitudinal seam is unnecessary, and the whole connection can be effected without the use of any other tool than a wrench. Any strain incident to weight will be ineffectual to shear the connecting screw, which will be under tensile strain only. It is also unnecessary to crimp down or reduce the end of the inner section, the bolt serving to both spread open and draw together the end of the outer section. In addition to splicing the ends and holding them together, the screw also serves to hold the longitudinal seam together.

The invention is not limited to the exact embodiment shown, but is capable of modification within the scope thereof.

I claim:

1. A cylindrical structure formed of sections of corrugated sheet metal, a corrugation at the end of one overlapping a corrugation at the end of the other, the outer section having a longitudinal seam, lugs fastened to the edges of the section on opposite sides of the seam, and a screw connecting the lugs and adapted to close the longitudinal seam and clamp the outer section on the inner one.

2. A culvert comprising a body portion formed of sheet metal of cylindrical shape, with its edges in overlapping positions, lugs secured to the adjacent edges, and a bolt detachably connected with said lugs, said bolt and lugs so arranged that when the bolt is turned in one direction, said edges will be spread, and when turned in the opposite direction, said edges will be drawn together.

3. A cylindrical structure formed of sections of corrugated sheet metal plates, a corrugation at the end of one overlapping a corrugation at the end of the other, the outer section having an openable longitudinal seam, lugs fastened to opposite edges of the plate in one of the corrugations adjacent the seam and near the end of the section, a screw threaded at both ends and extending through the lugs, and nuts on the screw on both sides of each of the lugs, whereby to either spread or close the seam.

In testimony whereof I affix my signature, in presence of two witnesses.

OTTO A. HAAS.

Witnesses:
J. E. PYLE,
A. L. KILLINGSWORTH.